US009264235B2

(12) United States Patent
Truskovsky et al.

(10) Patent No.: US 9,264,235 B2
(45) Date of Patent: Feb. 16, 2016

(54) APPARATUS, SYSTEM AND METHOD FOR VERIFYING SERVER CERTIFICATES

(75) Inventors: Alexander Truskovsky, Waterloo (CA); Neil Patrick Adams, Kitchener (CA); Eli Omen Jackson, Waterloo (CA)

(73) Assignee: BlackBerry Limited, Waterloo (CA)

( * ) Notice: Subject to any disclaimer, the term of this patent is extended or adjusted under 35 U.S.C. 154(b) by 417 days.

(21) Appl. No.: 12/947,062

(22) Filed: Nov. 16, 2010

(65) Prior Publication Data

US 2012/0124375 A1    May 17, 2012

(51) Int. Cl.
  *G06F 21/10* (2013.01)
  *H04N 21/4405* (2011.01)
  *H04L 9/32* (2006.01)
  *H04L 29/06* (2006.01)

(52) U.S. Cl.
  CPC .......... *H04L 9/3263* (2013.01); *H04L 63/0823* (2013.01); *H04L 63/0869* (2013.01); *H04L 63/166* (2013.01); *H04L 2209/80* (2013.01)

(58) Field of Classification Search
  USPC .............. 705/65; 713/151, 156, 168; 719/330
  See application file for complete search history.

(56) References Cited

U.S. PATENT DOCUMENTS

| | | | | |
|---|---|---|---|---|
| 7,043,633 | B1 * | 5/2006 | Fink et al. .................... | 713/162 |
| 2002/0099663 | A1 * | 7/2002 | Yoshino et al. .................. | 705/65 |
| 2003/0061510 | A1 * | 3/2003 | Hartmann et al. ............ | 713/201 |
| 2004/0034776 | A1 * | 2/2004 | Fernando et al. ............. | 713/171 |
| 2004/0054885 | A1 * | 3/2004 | Bartram et al. ............... | 713/152 |
| 2004/0216150 | A1 * | 10/2004 | Scheifler et al. .............. | 719/330 |
| 2005/0120203 | A1 * | 6/2005 | Yeh et al. ...................... | 713/156 |
| 2006/0136724 | A1 * | 6/2006 | Takeshima et al. ........... | 713/168 |
| 2006/0149968 | A1 | 7/2006 | Ederly et al. | |
| 2006/0155855 | A1 * | 7/2006 | Hamai .......................... | 709/227 |
| 2008/0052765 | A1 * | 2/2008 | Shinomiya et al. ............... | 726/3 |
| 2009/0138576 | A1 * | 5/2009 | Sekimoto et al. ............. | 709/219 |
| 2010/0058317 | A1 * | 3/2010 | Braams ......................... | 717/171 |
| 2011/0219442 | A1 * | 9/2011 | Brabson et al. ................. | 726/10 |
| 2012/0066346 | A1 * | 3/2012 | Virmani et al. ............... | 709/219 |

OTHER PUBLICATIONS

Matthias Enzmann et al., "A Note on Certificate Path Verification in Next Generation Mobile Communications" C. Muller-Schloer et al. (Eds.): ARCS 2004, LNCS 2981,pp. 273-287.

Mohamad Badra et al. "A lightweight identity authentication protocol for wireless networks" Computer Communications 27 (2004) 1738-1745; 2004 Elsevier B.V.

Hovav Shacham et al. "Client Side Caching for TLS" ACM Trans. Info. & Sys. Security, 7(4):553-75, Nov. 2004.

T. Dierks et al. RFC 5246 "The Transport Layer Security (TLS) Protocol Version 1.2" Aug. 2008 available at: www.ietf.org/ipr; The IETF Trust (2008).

(Continued)

*Primary Examiner* — Peter Poltorak
*Assistant Examiner* — Huan V Doan
(74) *Attorney, Agent, or Firm* — Rowand LLP

(57) ABSTRACT

A device and method are provided for a device that authenticates a server over a network. The device and method are operable to contact the server to initiate a handshaking operation. The device receives certificate information and handshaking information from the server. The device completes the handshaking operations to establish the connection with the server. The device downloads the content from the server through the connection before authenticating the server to establish a secure connection. In some aspects, the device may display a portion of the downloaded content before the server is authenticated.

17 Claims, 13 Drawing Sheets

(56) References Cited

OTHER PUBLICATIONS

Fuller, Benjamin W., "ASE: Authenticated Statement Exchange", Network Computing and Applications (NCA), 2010 9th IEEE International Symposium ON, IEEE, Piscataway, NJ, USA; Jul. 15, 2010, pp. 155-161.

T. Dierks and E. Rescorla, "The Transport Layer Security (TLS) Protocol Version 1.2; rfc5246.txt" Aug. 1, 2008, Internet Engineering Task Force.
EESR from EP Application No. 10191314.3 dated Jun. 5, 2011.
Examination Report from EP Application No. 10191314.3 dated Jun. 24, 2011.

* cited by examiner

APPARATUS, SYSTEM AND METHOD FOR VERIFYING SERVER CERTIFICATES

BACKGROUND

This application relates to on-line communications. In particular, it relates to a device, system and method for improving a user's experience during on-line communications Secure on-line communications rely upon the exchange and validation of security certificates. Checking the status of a security certificate, particularly in a mobile or other bandwidth-limited environment, can be sufficiently time consuming as to disrupt a user's experience while obtaining on-line content. In some instances, delays in validating certificates can cause a connection with an on-line content server to timeout, requiring a user to re-initiate the connection.

In general, in order to conduct on-line communications in a secure manner, an agreed set of protocols must be established for the sender and receiver to follow to maintain a secure connection across a network. Currently a common mechanism used on-line is the Transport Layer Security (TLS) Protocol. This protocol is well understood to skilled persons, and is continually updated as a generally available standard. The TLS Protocol is generally described in the "Internet Official Protocol Standards" and updated from time to time (see RFC 5246—standard for TLS version 1.2). Prior to the adoption of TLS, the Secure Sockets Layer (SSL) protocol was widely used.

This application is described with reference to the current protocol generally in use, TLS, though it will be understood that the methods may be applicable for other protocols for exchanging security certificates to authenticate an on-line content provider, and the specific sequence of steps to carry out the handshaking may vary in other protocols.

The TLS protocol provides a mechanism for a client to contact a server across a network in a secure manner. By following the protocol the client and server may establish endpoint authentication of the client and server and an encrypted communication channel between the client and the server. In a typical HTTP application the client contacts the server and requests the server to authenticate itself, while the client may remain anonymous. TLS does more generally support authentication of both parties, which requires each party to have its own security certificate. Most often such bi-lateral authentication is reserved for enterprise applications.

In the example of a TLS protocol, a "handshake" protocol is specified. The handshaking between the client and the server when first starting to communicate establishes: i) an agreed protocol version; ii) selection of a common cryptographic algorithm; iii) optionally authentication of one or both parties; and, iv) exchange of public key encryption information to generate shared secrets (private keys). Typically, most secure communication protocols would generally include these four items.

The TLS Handshake Protocol involves the following steps for bi-lateral authentication (referenced from RFC 5246):

Exchange hello messages between client and server to: agree on algorithms; exchange random values; and, check for session resumption.

Exchange the necessary cryptographic parameters to allow the client and server to agree on a premaster secret.

Exchange certificates and cryptographic information to allow the client and server to authenticate themselves.

Generate a master secret from the premaster secret and exchanged random values.

Provide security parameters to the record layer.

Allow the client and server to verify that their peer has calculated the same security parameters and that the handshake occurred without tampering by an attacker.

Once the Handshake Protocol has been completed, the client and server can securely exchange information using the calculated security parameters.

In a typical on-line web environment, however, a client device will conduct a unilateral authentication of an on-line resource. That is, the handshake will authenticate the server by its certificate, but the device is not authenticated by a certificate.

For example, a user attempting to access a secure on-line resource will carry out the TLS handshake protocol, except that the server does not authenticate the client. The client authenticates the server and exchanges the information required to calculate the security parameters to establish a secure connection to the server. This may include, for instance, the following steps:

Client sends the server a "ClientHello" message including TLS, compression and encryption information Server responds to the client with a "ServerHello" message including TLS, compression and encryption information Server sends its Certificate message to the Client Server sends a "ServerHelloDone" message to the Client Client authenticates Certificate Client sends the server a "ClientKeyExchange" message Client and Server use the exchanged information to establish the security parameters Client sends the Server a "ChangeCipherSpec" to establish connection has been authenticated and future communications will be secured by encryption Client sends the Server an encrypted "Finished" message Server decrypts "Finished" message to confirm the handshake and the secure connection from the client's end Server sends the Client a "ChangeCipherSpec" and a "Finished" message Client decrypts the "Finished" message to confirm the handshake from the server's end Handshake complete, secure connection established Once connected, the client device will download content from the server, such as html code, java script, etc. . . . , for execution by the client device to present an authentication portal to a user of the client device. The user may then interact with one or more user interfaces resident on the client device to enter authentication information which is sent by the client device to the server over the secure connection. The server may then authenticate the user by authenticating the user-supplied authentication information with server-resident authentication information.

The authentication may comprise a comparison of the received values to server-resident values, or may comprise processing or converting the received values, for instance by using a hash function, before comparing the processed received values with the server-resident values. Other known methods of authentication may also be employed.

One problem faced with on-line authentication, especially in a bandwidth constrained or mobile application, is the latency inherent in authenticating certificates. For mobile client devices, for instance, establishing a TLS connection may be challenged as the time required to carry out the steps necessary to verify the certificate(s) may be too long causing the TLS handshake with the server to time out.

It would be advantageous for a device, system or method to alleviate some of the current problems relating to on-line communications.

BRIEF DESCRIPTION OF THE DRAWINGS

In drawings which illustrate by way of example only embodiments of the present application.

DETAILED DESCRIPTION

Figure 1:
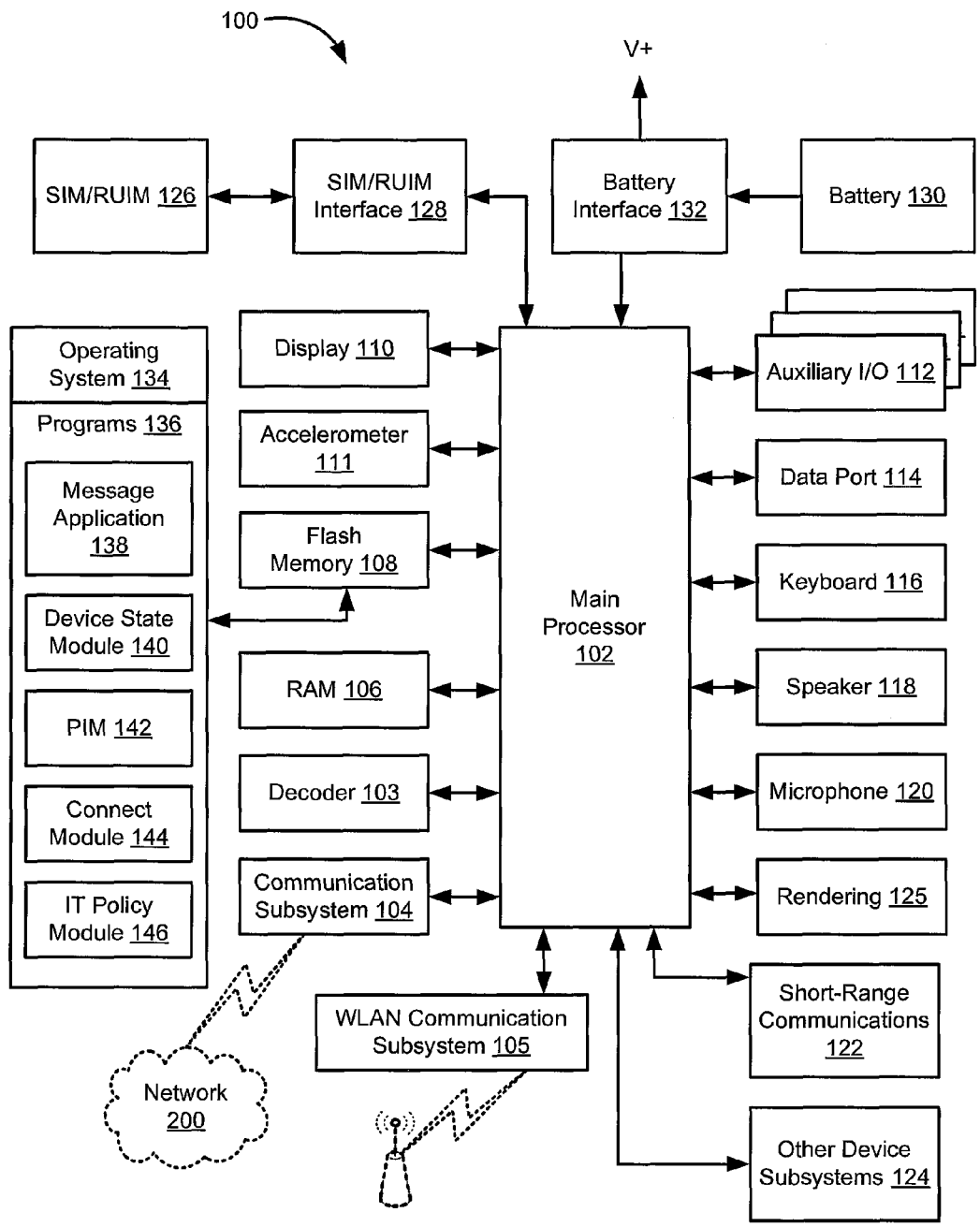
FIG. 1 is a block diagram of an embodiment of a mobile device.

In an embodiment, a method is provided for a client device authenticating a content server accessed over a network, the method comprising: the client device contacting the content server to initiate a handshaking operation to establish a connection; the client device receiving, from the content server, handshaking information and content server certificate information to be authenticated; and, the client device authenticating the content server using the certificate information. Wherein the client device may complete the handshaking operation using the handshaking information to establish the connection with the content server prior to the client device authenticating the certificate information to establish a secure connection with the content server.

In an embodiment, a client processing device operative to authenticate a content server may be provided. The client device may comprise: a processing unit for executing instructions stored in a memory of the client device; network connection means in communication with the processing unit for accessing the network; and, a user interface for displaying content to a user of the client device; wherein the client device is operative to: contact the content server to initiate a handshaking operation over the network; receive certificate information and handshaking information from the content server; complete the handshaking operations to establish a connection with the content server; and, authenticate the content server. After authenticating the content server, the client device may treat the connection as a secure connection.

In an aspect, the client device may download content from the content server before authenticating the content server. The client device may execute the downloaded content after authenticating the content server. In an aspect, the executable content may comprise JavaScript instructions. In an aspect, the non-executable content comprises HTML code for rendering a web page. In an aspect, after the device downloads the content, but before the device authenticates the content server, the device may further display non-executable content from the downloaded content on a user interface of the device. In an aspect, after the device displays the non-executable content, the device may collect user input responsive to the downloaded content, but waits to forward the collected user input to the content server until the content server has been authenticated. In an aspect the device may complete the handshaking operations and download the content, while the device authenticates the content server.

In an embodiment the client device may authenticate the content server using a certificate authority server.

In an embodiment, if the client device fails to authenticate the content server, the client device may terminate the connection.

In an embodiment, the client device may be operable to operate in a limited functionality state and an expanded functionality state, and wherein before the client device authenticates the content server, the client device may operate in the limited functionality state and upon authentication, the client device may transition to the expanded functionality state. The client device may receive instructions from a host server through the network to set conditions of the limited functionality state and the expanded functionality state.

In an embodiment, the client device receives a request for server content from a requesting device, and the client device contacts the content server to initiate the handshaking operation to obtain the requested content to forward to the requesting device. In an aspect, the client device may forward the requested content to the requesting device before the client device authenticates the content server. The client device may authenticate the content server, and then forward an authentication notification to the requesting device. In an aspect, the client device may receive user input from the requesting device responsive to the requested content, and the client device may forward the user input after the client device has authenticated the content server.

In an aspect, of the method, while the client device is completing the handshake and downloading the content, the device authenticates the content server. The client device may authenticate the content server by contacting a certificate authority over the network to obtain certificate authentication information corresponding to the certificate information and the client device authenticating the content server by authenticating the certificate information with the certificate authentication information.

In an aspect, of the method, if the client device fails to authenticate the content server, the client device terminates the secure connection. In another aspect, of the method, if the client device fails to authenticate the content server, the client device contacts another certificate authority to authenticate the content server.

In an aspect, of the method, the client device is operable to operate in a limited functionality state and an expanded functionality state, and before the client device authenticates the content server, the client device operates in the limited functionality state. The limited functionality state may comprise executing only read operations and prohibiting write operations. The limited functionality state may further comprise prohibiting execution of scripts, such as JavaScript. In an embodiment, the limited functionality state may prohibit the sending of user or device information to the content server other than handshaking information.

In an aspect, the client device may receive instructions from a host server through the network to set conditions of the limited functionality state and the expanded functionality state. The conditions may set the level of functionality of the client device or may set a trigger for when the state may change between levels. In an aspect, the conditions comprise an identity of the content server.

In an embodiment, a client computer processing device is provided, the client device operative to authenticate a content server accessed over a network to obtain content over a secure connection, the client device comprising: a processing unit for executing instructions stored in a memory of the client device; network connection means in communication with the processing unit for accessing the network; a user interface for displaying content to a user of the client device; and, a user input interface for receiving content from the user. The client device is operative to: contact the content server to initiate a handshaking operation over the network; receive certificate information and handshaking information from the content server; complete the handshaking operations to establish the secure connection with the content server; and, download the content from the content server through the secure connection, before authenticating the content server.

In an aspect, the client device is further operative to determine whether the content server has been authenticated and if the content server has been authenticated the processing unit executes executable content from the downloaded content. The executable content may comprise JavaScript instructions.

In an aspect, the client device may be operative to display non-executable content from the downloaded content on the user interface before authenticating the content server. The non-executable content may comprise HTML code for rendering a web page.

In an aspect, the client device may be operative to authenticate the content server while the client device completes the handshake and downloads the content. The device may, to authenticate the content server, be operative to contact a certificate authority over the network to obtain certificate authentication information corresponding to the certificate information; and, authenticate the server by authenticating the certificate information with the certificate authentication information.

In an aspect, the client device may be operative to terminate the secure connection if the authentication fails.

In an aspect, the client device may be operable to operate in a limited functionality state and an expanded functionality state, and wherein the client device operates in the limited functionality state until the content server is authenticated. The client device may further be operable to receive instructions from a host server through the network, the instructions executed by the processing unit to set conditions of the limited functionality state and the expanded functionality state. The conditions may comprise an identity of the content server.

In an embodiment, the client device may comprise a client server that contacts the on-line content server on behalf of a requesting device, the requesting device submitting a request for content to the client server. In an aspect, the client server may download content from the server before authenticating the content server. The client server may forward the downloaded content to the requesting device before the client server authenticates the content server. In an aspect, the client server may be operable to forward an authentication notification to requesting device after the client server authenticates the on-line content server.

Figure 2:
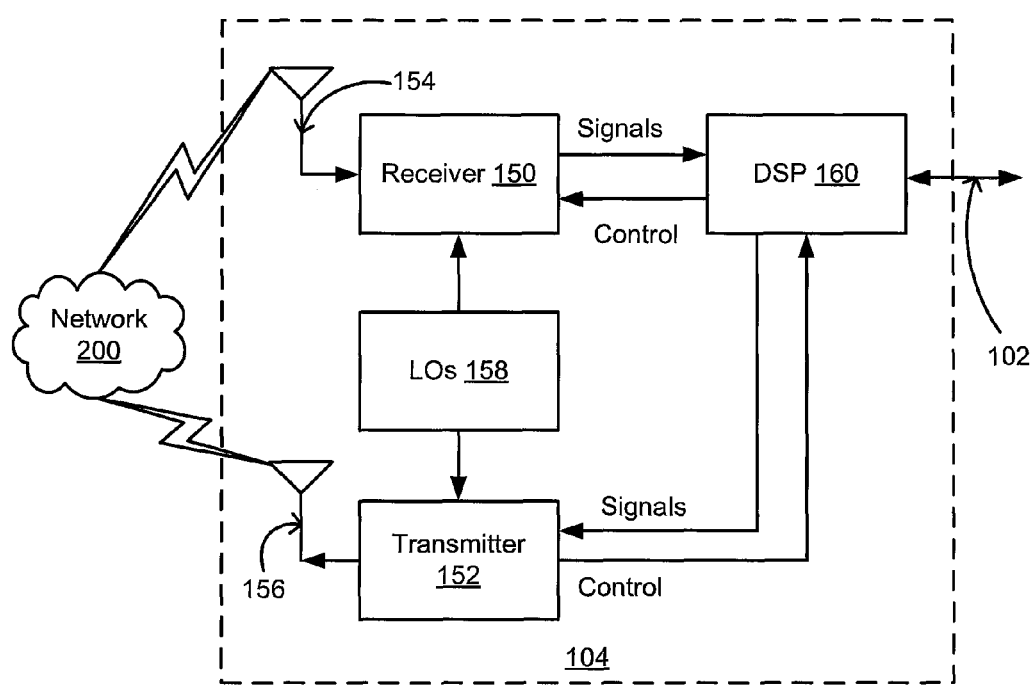
FIG. 2 is a block diagram of an embodiment of a communication subsystem component of the mobile device of FIG. 1.
Figure 3:
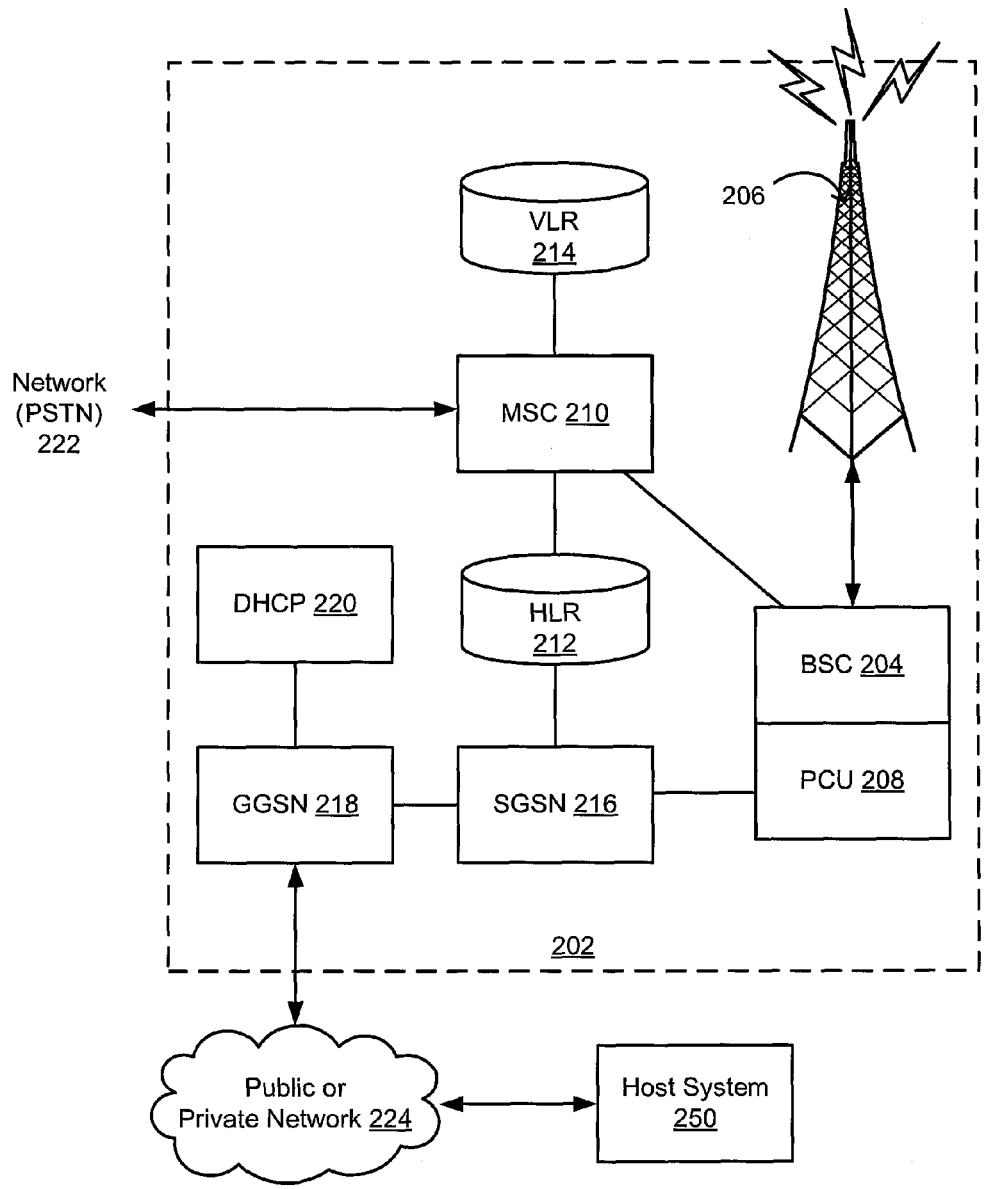
FIG. 3 is an exemplary block diagram of a node of a wireless network for use with the mobile device of FIG. 1.
Figure 4:
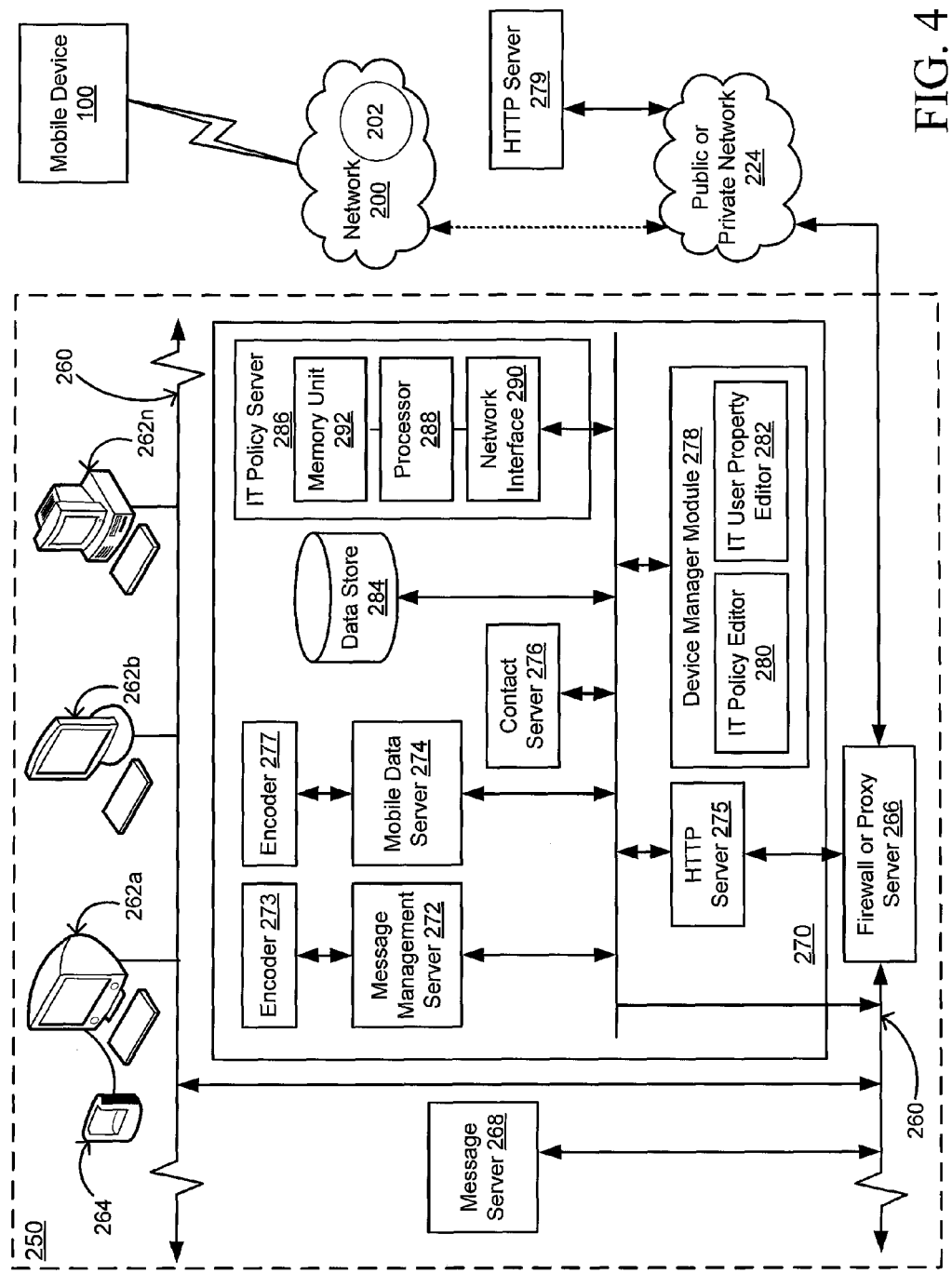
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio 110 subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Figure 5:
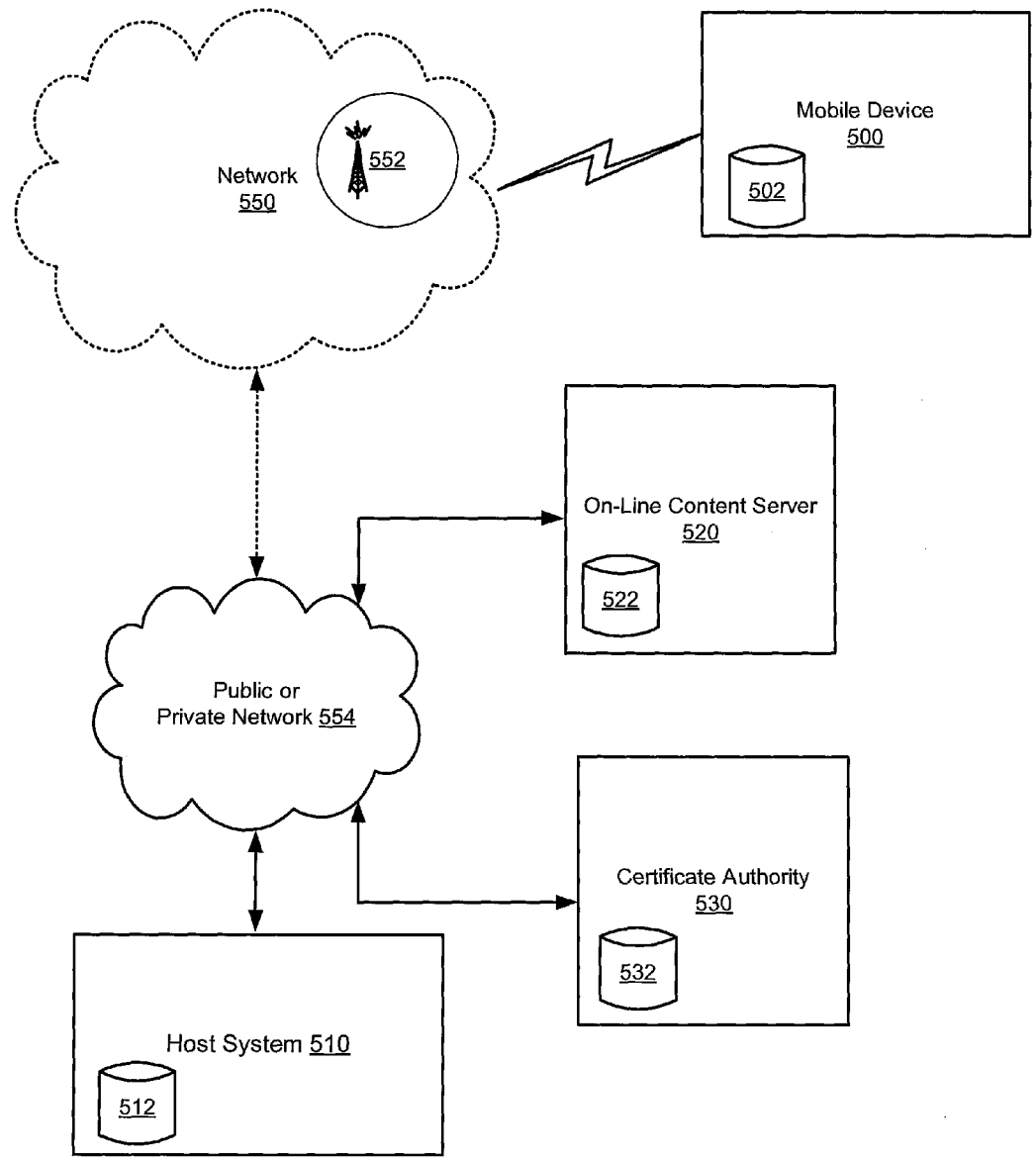
FIG. 5 is a block diagram illustrating an embodiment of a mobile device accessing an on-line content server.

Referring to FIG. 5, an embodiment is illustrated where mobile device 500 is accessing a wireless network 550, for instance through node 552. In the embodiment illustrated, mobile device 500 includes a mobile data store 502 which may comprise a secure data store.

The wireless network 550 is connected to a public or private network 554 which provides connectivity to host system 510. As illustrated, in this embodiment, host system 510 may comprise a host data store 512.

Also available on the network 554 is an on-line content server 520 and a certificate authority 530. As illustrated, in this embodiment, the on-line content server 520 may comprise a content data store and the certificate authority 530 may comprise an authority data store 532.

Depending upon the embodiment, the host system 510, on-line content server 520 and certificate authority 530 may comprise different systems or the same system providing different functionality. A corporate application, for instance, may include a host system 510 for data storage and control of the mobile device 500 as described above. A personal application may include a host system 510 that is transparent to the user, or may exclude a host system 510 entirely.

The certificate authority 530 may comprise the host system 510 or may comprise a third party Certificate Authority. The host system 510 may maintain local copies of certificates and certificate authentication in host data store 512, which may be periodically updated from certificate authority 530.

In an embodiment, mobile device 500 may attempt to access content available from the on-line content server 520.

In the embodiment, the device 500 seeks to establish a secure connection, for instance a unilateral TLS connection, with the on-line content server 520. Instead of carrying out the standard mechanism, however, the mobile device 500 may carry out a modified process to reduce the likelihood of a timeout while authenticating the on-line content server 520.

Figure 6A:
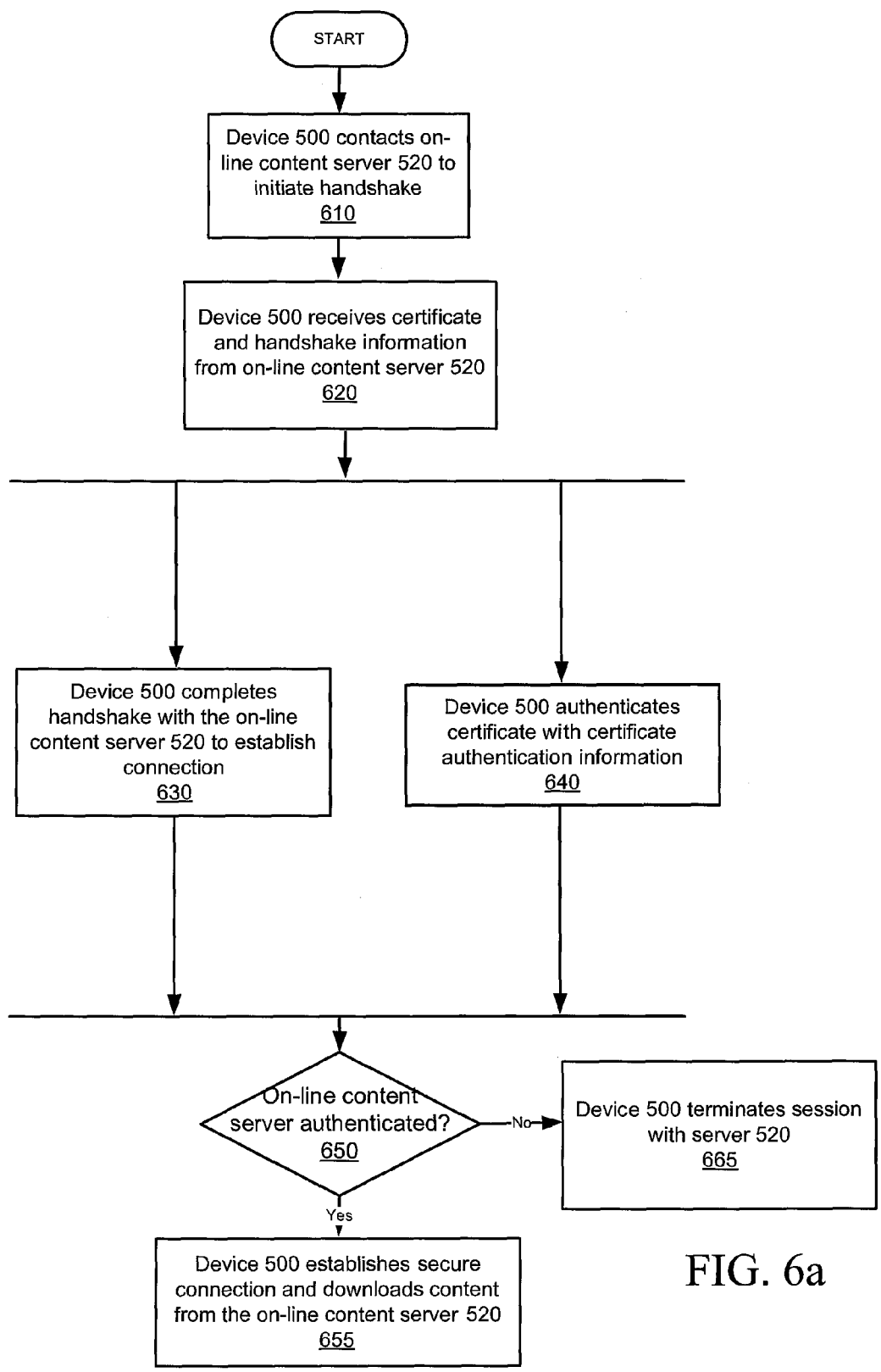
FIG. 6a is a process flow diagram illustrating an embodiment of operations of a mobile device.

Referring to FIG. 6a, the mobile device 500 may, for instance, carry out the following steps as a client device contacting the on-line content server 520. In step 610, device 500, acting as a client device, contacts the on-line content server 520 to initiate the handshaking operations to establish a connection with the on-line content server 520. An example of a suitable handshaking procedure would be the TLS handshake, a widely used protocol for securing traffic carried by HTTP to form HTTPS. In an embodiment, device 500 may contact the on-line content server 520 by sending instructions through host system 510 as a pass-through server.

In step 620, the device 500 receives certificate information and handshaking information from the on-line content server 520. The certificate information typically comprises a certificate or certificate chain that contains information about the on-line content server 520 that may be used by the device 500 to authenticate the on-line content server 520 as known in the art. Typically, authentication consists of verifying the certificate information with certificate authentication information. In some instances, certificate authentication information may be obtained from a third party Certificate Authority, such as certificate authority 530 or host system 510 illustrated in FIG. 5, or some other external source. Authentication may alternatively consist of obtaining certificate authentication information from the certificate information, such as an expiration date (time), and the device 500 may perform authentication checks based upon the certificate information and information resident on the device 500.

In step 630, the device 500 completes the handshake with the on-line content server 520 to establish a connection. In step 640, the device 500 authenticates the certificate using certificate authentication information. Thus, the device 500 proceeds to establish the connection, including exchanging necessary encryption keys, before the device 500 has authenticated the server 520, but may not treat the connection as a secure connection until the server 520 has been authenticated.

In step 650, the device 500 determines whether the on-line content server has been authenticated in step 640. If the server 520 has been authenticated, then in step 655 the device 500 establishes a secure connection and may download content from the on-line content server 520 and proceed to execute the downloaded content, and display if applicable. If the server 520 has not been authenticated, then in step 665, the device 500 may terminate the session with the server 520. In an embodiment, the session may be terminated immediately upon failure to authenticate the server certificate.

In an alternate embodiment, instead of terminating the session, device 500 may attempt to re-authenticate the server 520, by re-initiating the handshake, requesting an updated certificate, or accessing a different certificate repository to authenticate the certificate. In a further embodiment, an authentication status would be maintained to determine whether the server 520 has been authenticated to maintain the device 500 in a state of limited operability while the server 520 has not been authenticated. In the further embodiment, the device 500 may maintain a checklist of authentication attempts: re-authentication, contact a different certificate authority, request updated certificate. While the device 500 is attempting authentication by following the checklist of attempts, the device 500 is preferably in the state of limited operability. The device 500 may either transition to a state of full operability upon successfully authenticating the server 520 with one or more of the attempts from the checklist of attempts, or if none of the attempts on the checklist of attempts are successful, the server 520 is not authenticated and the session may be terminated.

By way of example, the device 500 could start by requesting authentication of the certificate by contacting host system 510 which may act as a local certificate authority for recently authenticated certificates. If host system 510 supplied the initial certificate authentication information and authentication failed, or was otherwise unable to provide certificate authentication information, then device 500 could request authentication from a third party Certificate Authority, such as certificate authority 530 illustrated in FIG. 5.

Figure 6B:
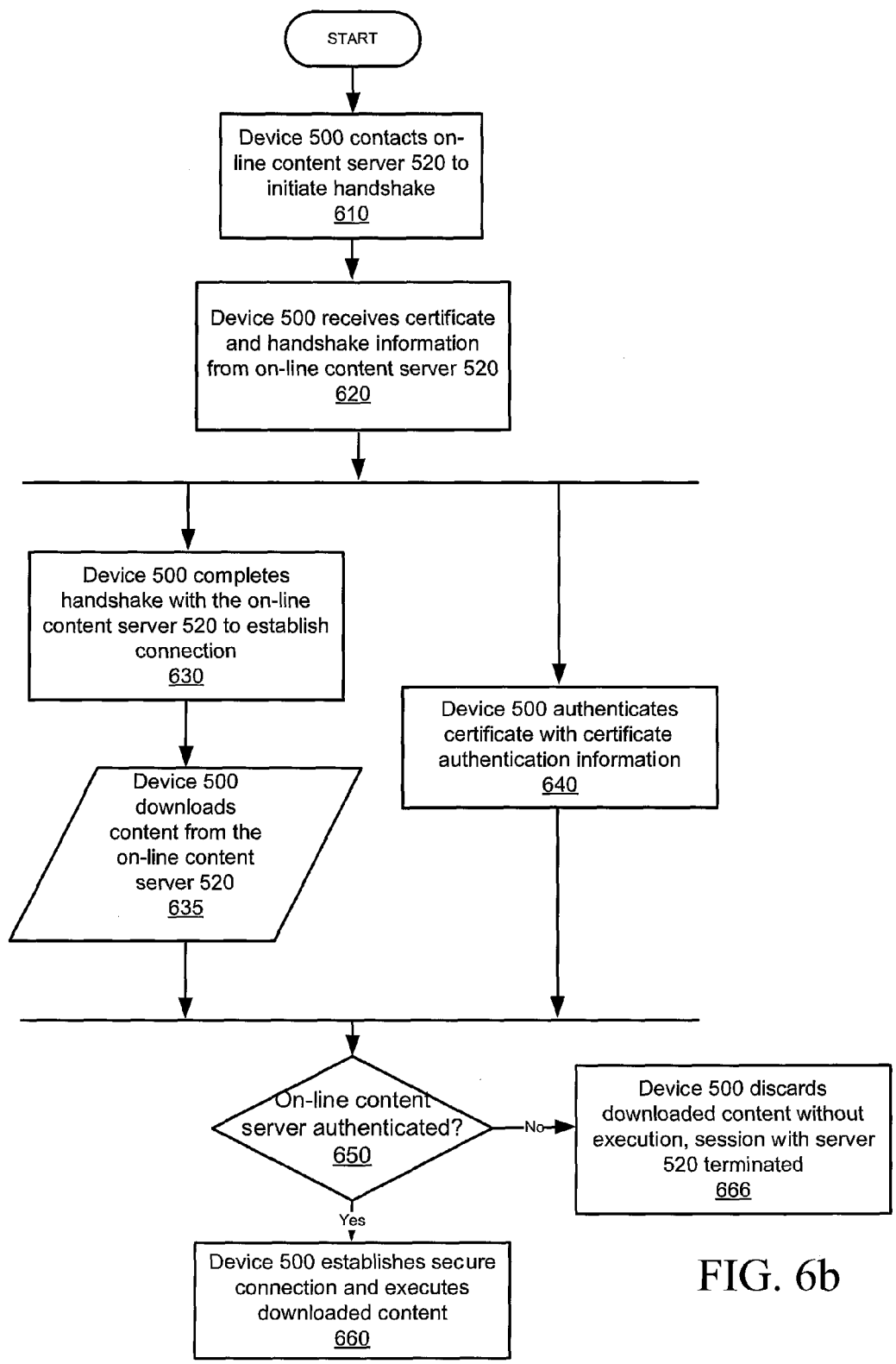
FIG. 6b is a process flow diagram illustrating an embodiment of operations of a mobile device.
Figure 6C:
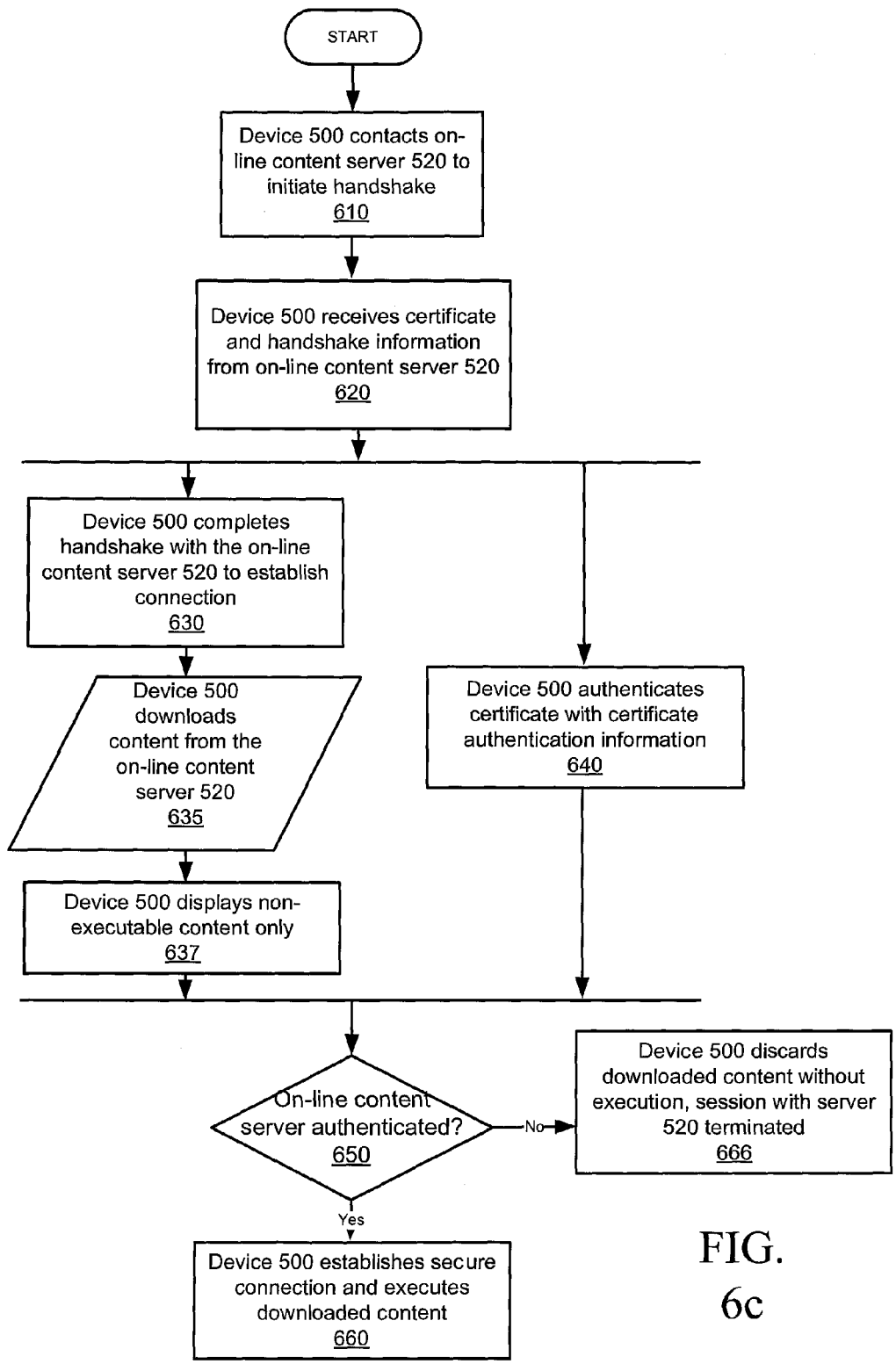
FIG. 6c is a process flow diagram illustrating an embodiment of operations of a mobile device.

Referring to FIGS. 6b and 6c, depending upon the level of security required, the process may be accelerated by allowing the device 500 to carry out further steps in obtaining information from the on-line content server 520 before the certificate has been authenticated in step 640. Preferably, the device 500 is set to operate in a limited functionality mode until the certificate, and associated on-line content server 520, has been authenticated to establish a secure connection.

Referring to FIG. 6b, after the device 500 completes the handshake to establish a connection in step 630, the device may proceed to download content from the on-line content server 520 in step 635. In step 650, the device 500 determines whether the on-line content server has been authenticated in step 640. If the server 520 has been authenticated, then in step 660, the device 500 establishes a secure connection and may execute the downloaded content, and display if applicable. If the server 520 has not been authenticated, then in step 666, the device 500 may terminate the session with the server 520 and discard the downloaded content without execution.

In an alternate embodiment illustrated in FIG. 6c, device 500 may take the additional step 637 of displaying non-executable content on a user interface of the device 500 while the device 500 is still authenticating the certificate in step 640. In this embodiment, while device 500 may render a web page based upon the downloaded content, for instance, executable content including scripts, flash or other executable instructions are not executed.

While FIGS. 6a, 6b and 6c illustrate the handshake completion and certificate authentication steps in parallel, it is understood that they could be occurring sequentially though steps 630 635 and 637 would be carried out without waiting for conclusion of authentication step 640.

Figure 6D:
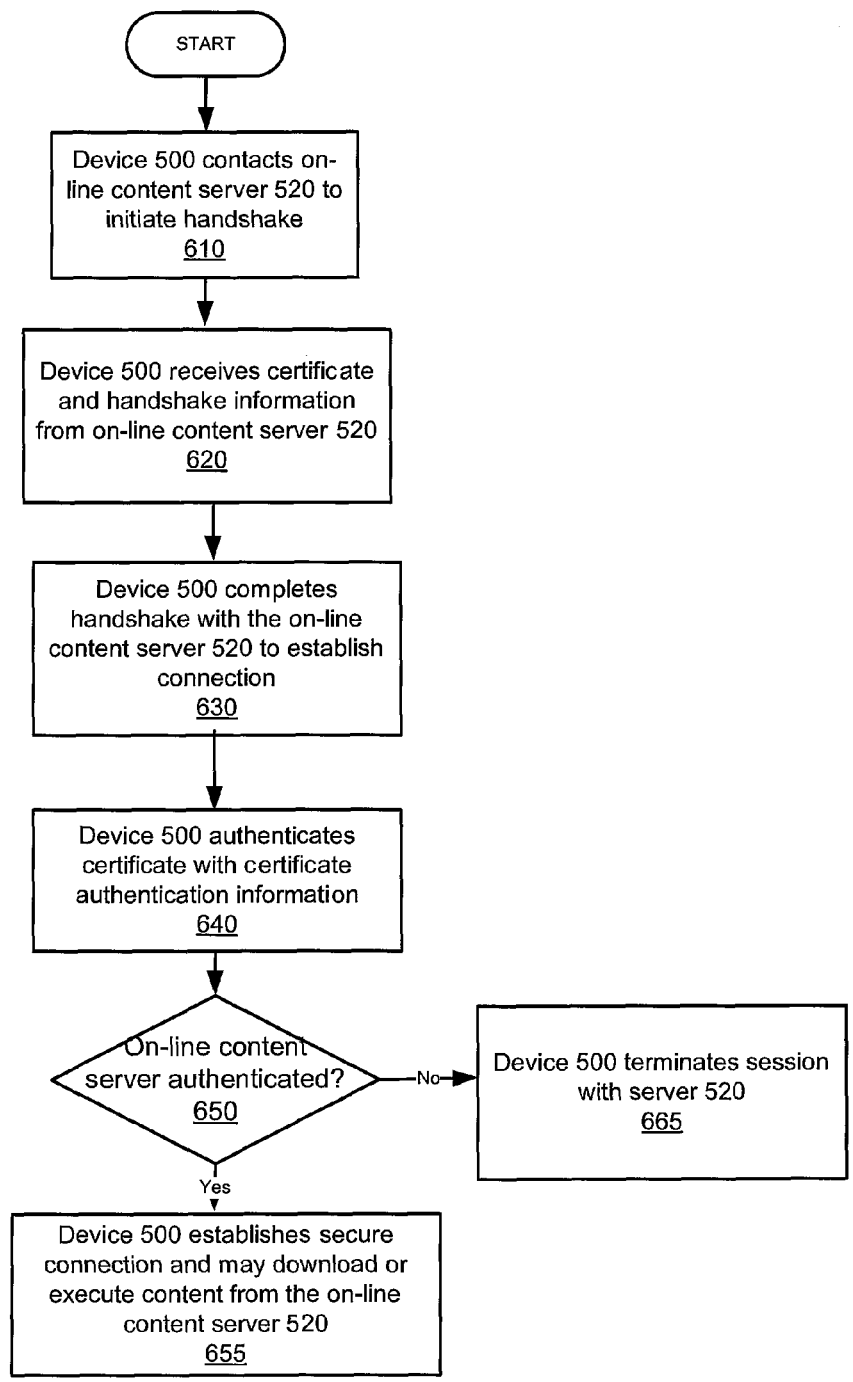
FIG. 6d is another process flow diagram illustrating an embodiment of operations of a mobile device.

Referring to FIG. 6d, the device 500 may perform steps 630 and 640 in sequence as indicated. In such a fashion, the handshaking procedure is completed by the device 500 before it has actually authenticated the on-line content server 520. Similar to the embodiments illustrated in FIGS. 6b and 6c, the device 500 may also carry out steps 635 and 637 in sequence before authenticating the certificate in step 640.

In all four cases, device 500 proceeds with safe steps, such as opening a connection, downloading content or displaying non-executable content. In an embodiment, device 500 may further remain operative, to receive input from the user. This may take place, for instance through a user input field within a web page rendered by the device 500 based upon content downloaded from the server 520 in step 635.

In a typical application, a device 500 would access an on-line content server 520, authenticate the server 520 and download content comprising a log-in portal web page through which a user may authenticate themselves with the on-line content server 520 by inputting user identifying information into log-in fields of the portal web page. In the embodiment described above, the device 500 may render the log-in portal web page, and collect user identifying information from a user while the device 500 is still authenticating the on-line content server 520. The device 500 does not, however, execute instructions downloaded from the content server 520, such as scripts, and further does not send information collected from the user to the server 520 until the server 520 has been authenticated to establish a secure connection. Therefore, step 660 may further comprise sending user information to the server 520.

Generically, FIGS. 6a, 6b and 6c may be summarised in that the device 500 accepts the server 520 as being authenticated and the device 500 proceeding as being operative to perform read operations (e.g. HTTP GET) on content downloaded form the server 520, but the device 500 being inoperative to write content (e.g. HTTP POST) to the server 520 or execute instructions (e.g. JavaScript) downloaded from the server 520. Thus, while the device 500 establishes a connection and proceeds with obtaining content though the server 520 has not yet been authenticated, the device 500 operates in a limited operability state that protects the user by restricting operations, such as posting information other than handshaking information or executing JavaScript, that could potentially harm the user if the server 520, or the connection between the server 520 and the device 500, has been comprised.

Step 640, where device 500 authenticates the certificate with certificate authentication information, may comprise different operations. In general, these operations may require requesting and receiving certificate authentication information from a third party, or may require the device 500 assessing certificate authentication information received with the certificate or certificate chain to authenticate/verify the certificate in order to authenticate the on-line server 520. Both types of operations may take a sufficient amount of time that the handshaking procedure may time-out before the authentication step 640 is completed.

While the device 500 is contacting the server 520, completing the handshake in step 630, downloading content in step 635 or displaying non-executable content in step 637, the device 500 may also, in step 640, contact a certificate authority 530 to request authentication of the certificate received in step 620. In step 643 the device 500 receives certificate authentication information from the certificate authority 530. In either case, device 500 proceeds by completing the handshake step 630 and downloading content step 635 without waiting for server authentication to be completed.

Figure 7:
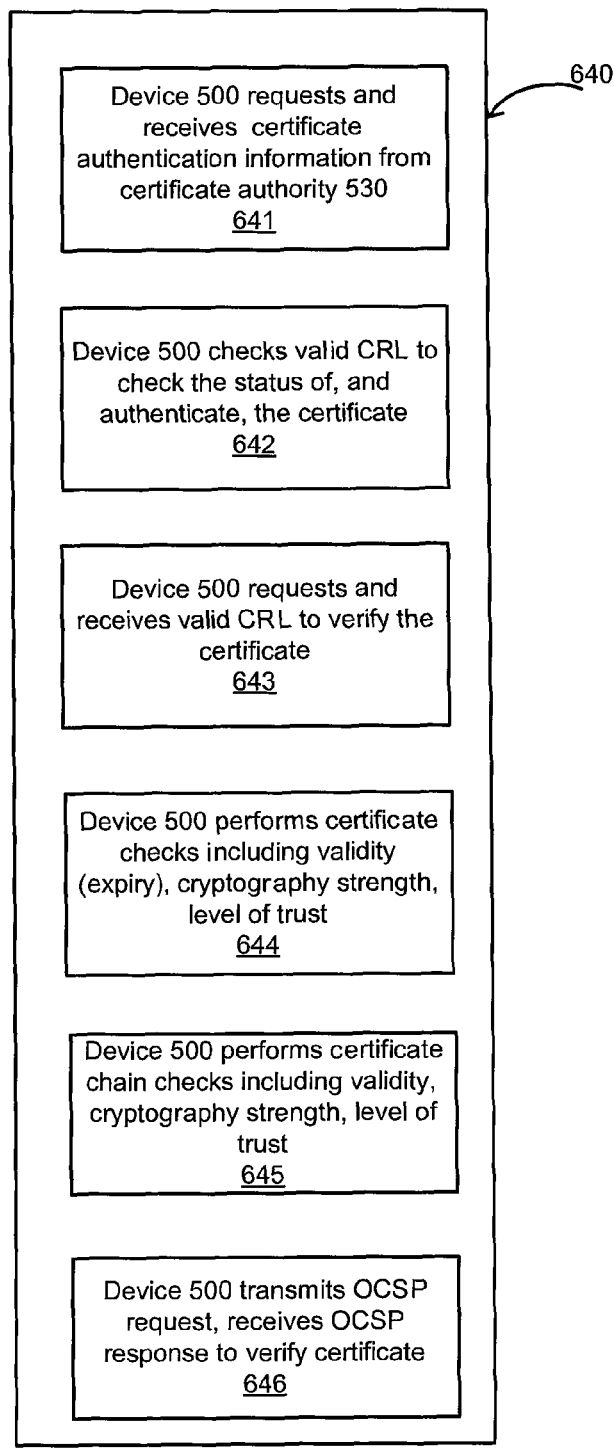
FIG. 7 is a process flow diagram illustrating an embodiment of operations of a mobile device.

Referring to FIG. 7, examples of the types of operations that may occur in step 640 are given. In operation 641, the device 500 may request and receive certificate authentication information from a certificate authority 530. In some circumstances, the device 500 may contact host system 510 first, and if the certificate authentication information is not available at host system 510, either host system 510 or the device 500 may contact the certificate authority 530 to obtain the certificate authentication information. In the case of host system 510 contacting the certificate authority 530, then host system 510 may respond to device 500 with the certificate authentication information received from the certificate authority 530.

In operation 642, the device 500 may check the certificate revocation status by checking a valid Certificate Revocation List (CRL). The CRL may be resident on the device 500 after being forwarded by the host system 510 or a certificate authority 530.

In operation 643, the device 500 may request a valid CRL from a third party, such as host system 510 or certificate authority 530. The device 500 may then receive the valid CRL and verify the certificate against the CRL.

In operation 644, the device 500 may perform certificate checks against the certificate or certificate chain received through the handshaking with on-line content server 520. These checks may include validity checks (confirming the certificate has not expired), cryptography strength checks, level of trust checks etc. . . .

In operation 645, the device 500 may perform the checks against the certificate chain to confirm that while the current certificate may be valid and secure, a preceding certificate in the chain may have compromised the information. In embodiments where device 500 receives the certificate as part of a certificate chain in step 620, the device 500 may check the received certificate chain. In embodiments where device 500 receives only the certificate in step 620, in operation 645 device 500 may request the certificate chain from the on-line content server 520 in order to carry out the checks.

In operation 646, the device 500 may transmit an Online Certificate Status Protocol (OCSP) request to host system 510 or a certificate authority 530. In some circumstances, the device 500 may contact host system 510 first, and if an OCSP response is not available at host system 510, either host system 510 or the device 500 may contact the certificate authority 530 to obtain the OCSP response. In the case of host system 510 contacting the certificate authority 530, then host system 510 may respond to device 500 with OCSP response received from the certificate authority 530.

In all of the embodiments of possible operations 641 642 643 644 645 646 that may be taken as part of step 640, the device 500 requires processing time to evaluate and check the status of a certificate in addition to any time required to contact and receive information from a third party.

Once the server 520 has been authenticated by the device 500, the device may treat the connection as secure and transition into an expanded or enhanced operability state that permits operations that are intended for the authenticated server, including posting user or device information to the server or executing instructions received from the server such as JavaScript instructions.

In an embodiment, the authentication status of the on-line content server 520 may be communicated to a user of the device 500 through a visual indication on a user interface of the device 500. In one aspect, the visual indication may comprise a highlighting of the address field or a portion of the address field, for instance the "https" portion of the address field, to alert the user that while a connection has been established, and content may be downloaded or displayed, the server 520 has not been authenticated. In another aspect, the visual indication may comprise an icon such as an unlocked padlock icon in place of the standard locked padlock icon present when a secure connection such as https has been established.

Figure 8A:
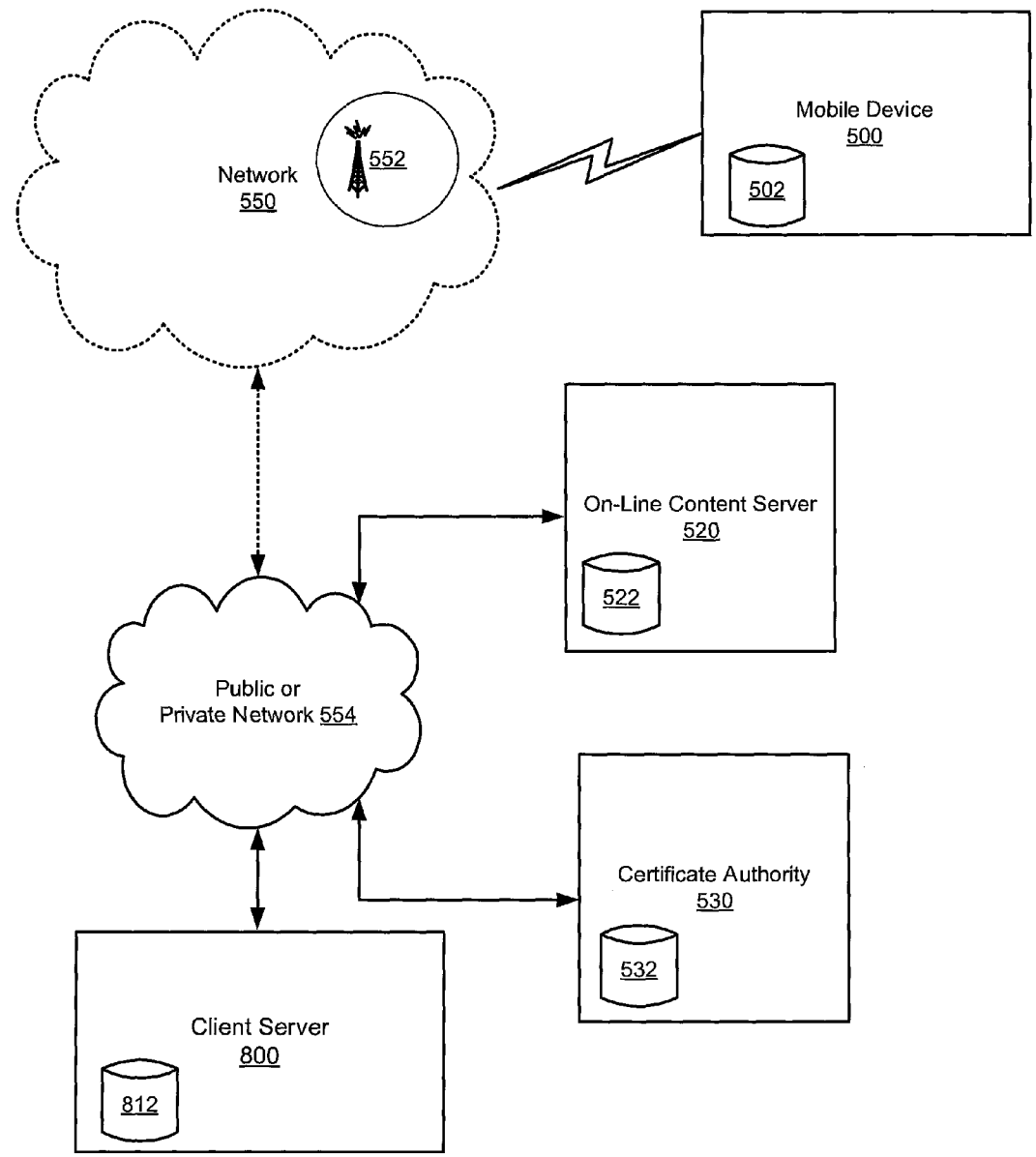
FIG. 8a is a block diagram illustrating an embodiment of a mobile device accessing an on-line content server through a client server.

Referring to FIG. 8a, in an embodiment, the device 500 may operate as part of a system in conjunction with a client server 800 which may include a client server data store 812. Client server 800 may comprise host system 510 or may comprise a different computing system. In the embodiment of FIG. 8a, the client server 800 may act as a client with the content server 520 on behalf of the device 500 which is requesting data.

Figure 8B:
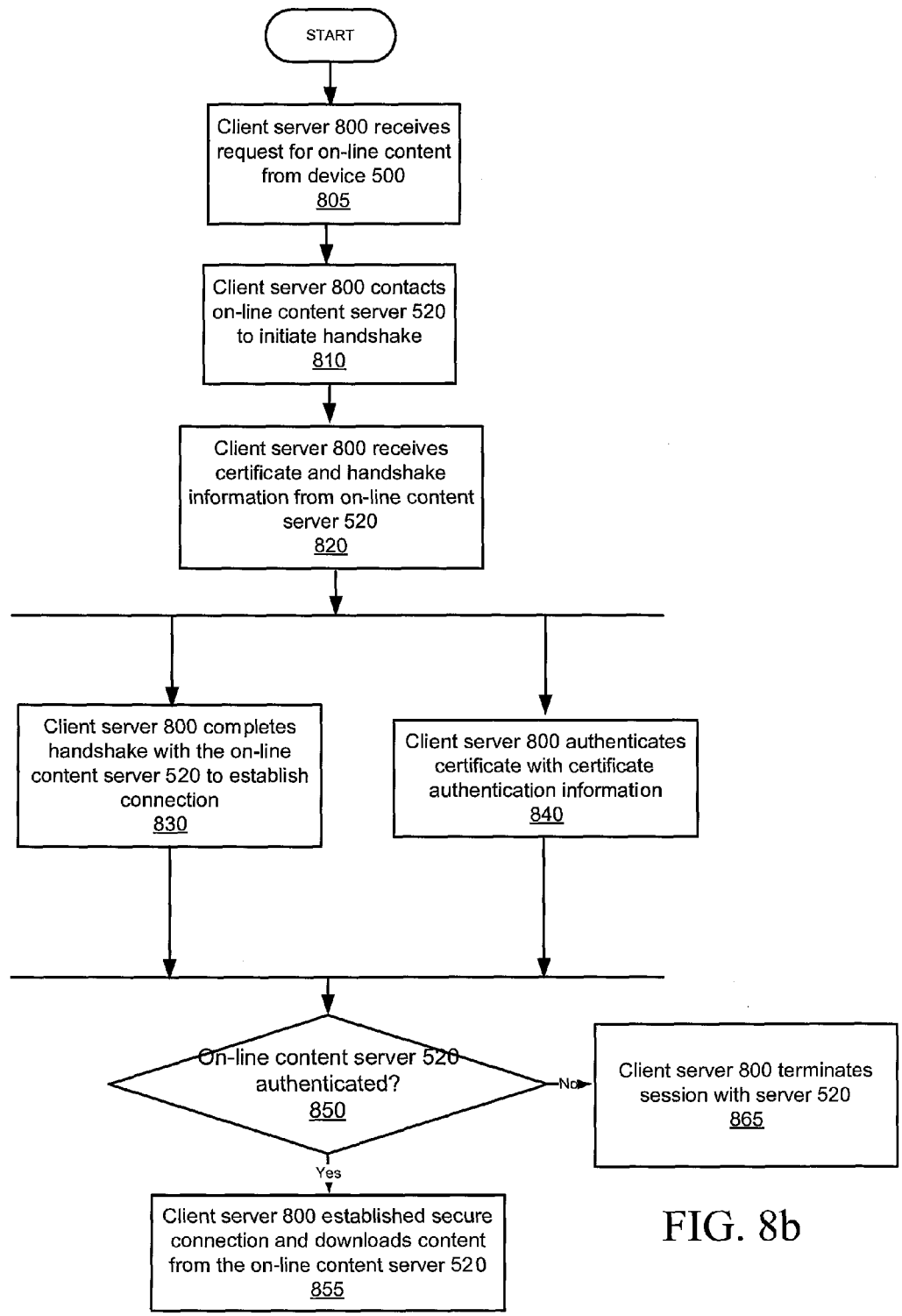
FIG. 8b is a process flow diagram illustrating an embodiment of operations of the client server.

Referring to FIG. 8b, device 500 may forward a request for on-line content from on-line content server 520 to client server 800. Client server 800 receives the request for on-line content from the device 500 in step 805. Client server 800 may contact on-line content server 520 to initiate handshaking in step 810. Client server 800 receives certificate information and handshaking information from on-line content server 520 in step 820. Client server 800 then completes the handshake with the on-line content server 520 to establish a connection in step 830. Client server 800 authenticates the certificate with certificate authentication information in step 840.

In step 850, client server 800 determines if the on-line content server 520 has been authenticated. If the on-line content server 520 is not authenticated, client server 800 terminates the session with the server 520. As indicated above for step 650, client server 800 may alternatively take additional methods to authenticate the server 520 before terminating the session.

If the on-line content server 520 is authenticated, client server 800 treats the connection as a secure connection and may proceed to download content from the on-line content server 520 for forwarding to the device 500 in step 855.

In an embodiment, the device 500 may enter a state of limited operability after forwarding the request for on-line content to the client server 800. Alternatively, the client server 800 may send the device 500 an instruction to enter the state of limited operability after receiving in step 805 a request from the device 500 for on-line content from on-line content server 520. In an aspect, the client server 800 may contact the on-line content server 520 after receiving the request for content from the device 500, and determine that the on-line content server 520 is providing secure content that requires authentication. After making the determination, the client server 800 may send the device 500 the instruction to enter the state of limited operability while initiating handshaking operations with the on-line content server 520.

In an embodiment, the client server may provide instructions to the device 500 to set the level of functionality after handshaking has been completed, but before the server 520 has been authenticated. For instance, the client server 800 may send an instruction that limits the operability of the device 500 to disable web page rendering prior to authentication of the server 520. Other operations may similarly be limited including executing JavaScript, receiving user input through a user interface, etc. . . .

In an aspect, this embodiment may be dependent upon a particular on-line content server 520 accessed. Thus, the level of functionality may be triggered by a server address being contacted. For instance, in a corporate environment, trusted web addresses may be accessed with greater functionality than unknown third party web addresses. While the functionality may be greater, the device 500 may preferably still be prohibited from executing scripts or posting information to defend against malicious third parties, such as through a "man in the middle" attack.

In an embodiment, similar to steps 635 and 637, the client server 800 may download content from the on-line content server 520 before the client server 800 has authenticated the certificate in step 840. In an embodiment, the client server may forward the downloaded content to the device 500 before the client server 800 has authenticated the certificate in step 840. In an embodiment, the device 500 may receive content from the client server 800 and display non-executable content only before the client server 800 has authenticated the on-line content server 520. In this embodiment, the client server 800 may forward an authentication notification to the device 500 that the on-line content server 520 has been authenticated. This notification may comprise an instruction to the device 500 to enter a higher functionality state.

In an embodiment, the device 500 may be operative to receive instructions from a host server, such as client server 800, a server within host system 250, or some other server which may in embodiments be located behind a firewall on the network. The instructions sent by the host server may set conditions of the limited functionality state and the expanded functionality state. The conditions may set the level of functionality of the device 500 or may set a trigger for when the state may change between levels. In an aspect, the conditions comprise an identity of the content server 520.

Figure 8C:
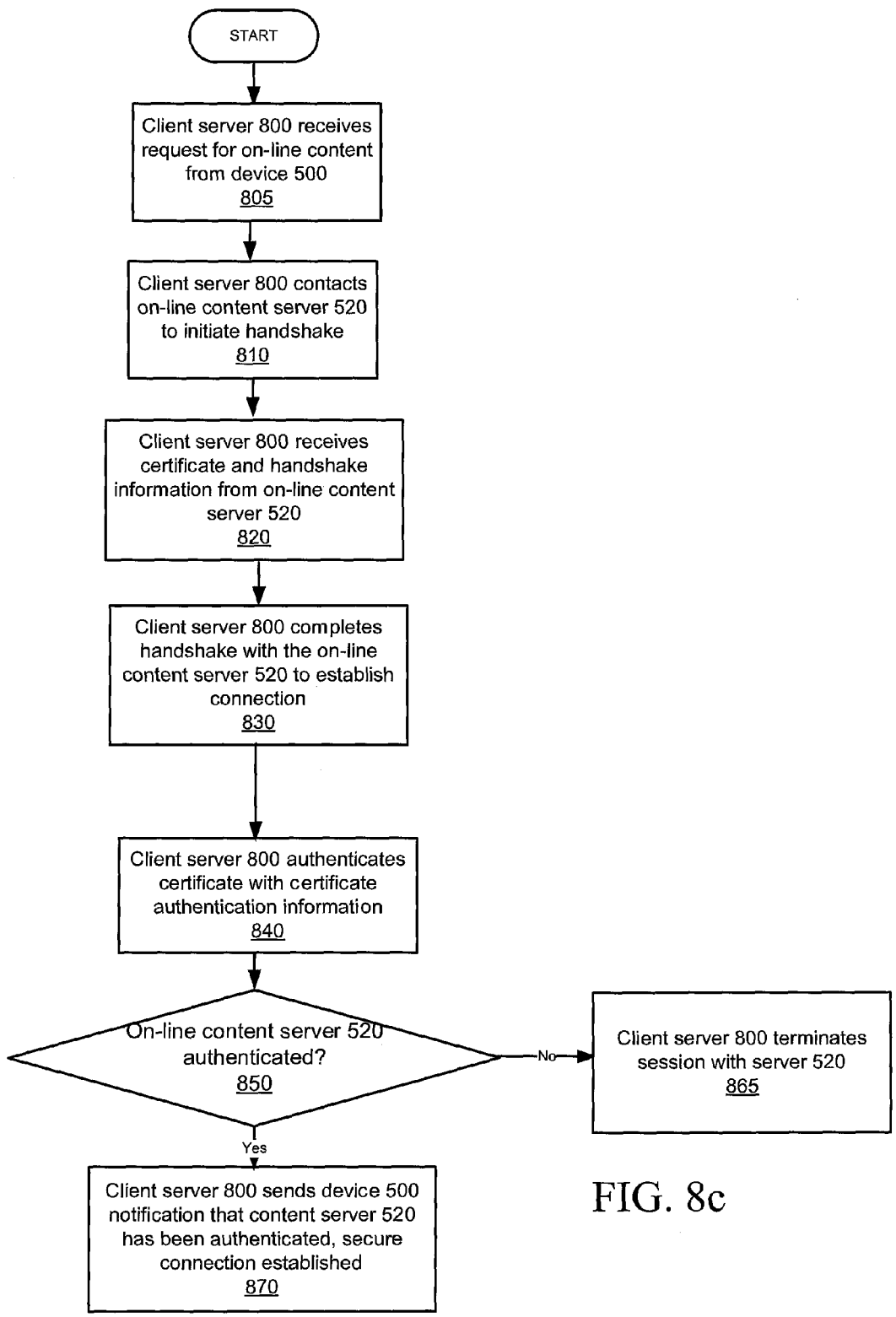
FIG. 8c is a process flow diagram illustrating an embodiment of operations of the client server.

Referring to FIG. 8c, an embodiment is illustrated where client server 800 carries out steps 830 and 840 in sequence. That is, the client server 800 completes the handshaking operation in step 830 before authenticating the certificate in step 840. The embodiment of FIG. 8c also illustrates the client server 800 sending a notification to the device 500 that the content server 520 has been authenticated in step 870 after the authentication decision step 850 has been completed in the affirmative. The embodiment does not illustrate content downloading and display steps in the sequence. As discussed above, these steps may take place before the content server 520 has been authenticated such that the notification step 870 comprises an indication to the device 500 to execute the downloaded content.

In an embodiment, the authentication status of the on-line content server 520 may be communicated to a user of the device 500 through a visual indication on a user interface of the device 500 until the device 500 receives an authentication notification from the client server 800. The authentication status may be communicated to the user throughout the period that the device 500 is operating in a state of limited functionality.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. It will also be appreciated that although the embodiments herein have been directed generally to calendar events, similar systems and methods may be carried out in respect of other types of time or schedule-based user data.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method for a client device authenticating a content server accessed over a network, the method comprising:
the client device contacting the content server to initiate a handshaking operation to establish a secure connection, the handshaking operation having a defined timeout period for completion;
the client device receiving, from the content server, handshaking information and content server certificate information to be authenticated;
the client device completing the handshaking operation with the content server, without completing the authentication, to establish a connection with the content server before the timeout period has expired, the client device restricting operations with the content server while the content server has not been authenticated;
the client device authenticating the content server using the certificate information; and,
if the client device authenticates the content server, the client device treating the connection as a secure connection without further authentication and removing restrictions on operations, and if the client device fails to authenticate the content server, the client device terminating the connection,
wherein the client device downloads content from the content server before authenticating the content server.

2. The method of claim 1 wherein the client device executes the downloaded content after authenticating the content server.

3. The method of claim 1 wherein after the client device downloads the content, but before the client device authenticates the content server, the client device further displays a non-executable portion of the downloaded content on a user interface of the client device.

4. The method of claim 3 wherein after the client device displays the non-executable portion, the client device collects user input responsive to the downloaded content, but waits to forward the collected user input to the content server until the content server has been authenticated.

5. The method of claim 1 wherein the method further comprises, while the client device is completing the handshaking operations and downloading the content, the client device authenticating the content server.

6. The method of claim 1 wherein the client device comprises a client server that receives a request for server content from a requesting device, and the client server contacts the content server to initiate the handshaking operation to obtain the requested content to forward to the requesting device.

7. A client computer processing device operative to authenticate a content server, the client device comprising:
a processor for executing instructions stored in a memory of the client device;
a communications subsystem in communication with the processing unit for accessing the network; and,
a user interface for displaying content to a user of the client device;
wherein the client device is operative to:
contact the content server to initiate a handshaking operation over the network, the handshaking operation having a defined timeout period for completion;
receive certificate information and handshaking information from the content server;

complete the handshaking operations with the content server, without completing the authentication, to establish a connection with the content server before the timeout period has expired, the client device restricting operations with the content server while the content server has not been authenticated;

download content from the content server through the connection before authenticating the content server;

authenticate the content server after completing the handshaking operations using the certificate information; and, if the client device authenticates the content server, treat the connection as a secure connection without further authentication and remove restrictions on operations, and if the client device fails to authenticate the content server, the client device operative to terminate the connection.

8. The client device of claim 7 wherein the client device is further operative to:

determine whether the content server has been authenticated and if the content server has been authenticated the processing unit executes executable content from the downloaded content.

9. The client device of claim 7 wherein the client device is further operative to display a non-executable portion of the downloaded content on the user interface before authenticating the content server.

10. The client device of claim 7 wherein the client device is further operative to authenticate the content server, while the client device completes the handshake and downloads the content.

11. The client device of claim 7 wherein the client device comprises a client server that is further operative to receive requests for content from a requesting device connected to the network and to contact the content server to initiate the handshaking operations on behalf of the requesting device to download the requested content.

12. A non-transitory computer-readable medium storing program instructions which, when executed by a processor in a client device, cause the client device to authenticate a content server accessed over a network, wherein the instructions cause the client device to:

contact the content server to initiate a handshaking operation to establish a secure connection, the handshaking operation having a defined timeout period for completion;

receive, from the content server, handshaking information and content server certificate information to be authenticated;

complete the handshaking operation with the content server, without completing the authentication, to establish a connection with the content server before the timeout period has expired, the client device restricting operations with the content server while the content server has not been authenticated;

download content from the content server before authenticating the content server;

authenticate the content server using the certificate information; and, if the client device authenticates the content server, treat the connection as a secure connection without further authentication and remove restrictions on operations, and if the client device fails to authenticate the content server, terminate the connection.

13. The computer-readable medium of claim 12, wherein the client device executes the downloaded content after authenticating the content server.

14. The computer-readable medium of claim 12, wherein after the client device downloads the content, but before the client device authenticates the content server, the client device further displays a non-executable portion of the downloaded content on a user interface of the client device.

15. The computer-readable medium of claim 14, wherein after the client device displays the non-executable portion, the client device collects user input responsive to the downloaded content, but waits to forward the collected user input to the content server until the content server has been authenticated.

16. The computer-readable medium of claim 12, wherein, while the client device is completing the handshaking operations and downloading the content, the client device authenticates the content server.

17. The computer-readable medium of claim 12, wherein the client device comprises a client server that receives a request for server content from a requesting device, and the client server contacts the content server to initiate the handshaking operation to obtain the requested content to forward to the requesting device.

* * * * *